United States Patent
Yoshii et al.

(10) Patent No.: US 11,296,328 B2
(45) Date of Patent: Apr. 5, 2022

(54) POROUS CATALYST, CATALYST LAYER FOR FUEL CELL, ELECTRODE, MEMBRANE ELECTRODE ASSEMBLY AND FUEL CELL, AND METHOD FOR PRODUCING POROUS CATALYST

(71) Applicants: SUZUTOYO SEIKO CO., LTD., Nagoya (JP); ENVIRONMENTAL SCIENCE INSTITUTE, LTD., Itami (JP)

(72) Inventors: Kumiko Yoshii, Itami (JP); Hideo Ueno, Itami (JP)

(73) Assignees: Environmental Science Institute, LTD, Itami (JP); SUZUTOYO SEIKO CO., LTD, Atsutka (JP)

( * ) Notice: Subject to any disclaimer, the term of this patent is extended or adjusted under 35 U.S.C. 154(b) by 304 days.

(21) Appl. No.: 16/604,661

(22) PCT Filed: Apr. 16, 2018

(86) PCT No.: PCT/JP2018/015677
§ 371 (c)(1),
(2) Date: Apr. 29, 2020

(87) PCT Pub. No.: WO2018/198852
PCT Pub. Date: Nov. 1, 2018

(65) Prior Publication Data
US 2021/0194015 A1    Jun. 24, 2021

(30) Foreign Application Priority Data
Apr. 25, 2017    (JP) ............................ JP2017-086138

(51) Int. Cl.
*H01M 8/10*    (2016.01)
*H01M 4/90*    (2006.01)
(Continued)

(52) U.S. Cl.
CPC ....... *H01M 4/9016* (2013.01); *H01M 4/8807* (2013.01); *H01M 8/1004* (2013.01); *H01M 2004/8689* (2013.01)

(58) Field of Classification Search
CPC ............. H01M 4/9016; H01M 4/9025; H01M 4/9041; H01M 4/8807; H01M 4/8803;
(Continued)

(56) References Cited

U.S. PATENT DOCUMENTS 7,737,073 B2   6/2010   Mironov et al.
7,947,623 B2   5/2011   Mironov et al.
(Continued)

FOREIGN PATENT DOCUMENTS

| CN | 101888900 A | 11/2010 |
| CN | 102665901 A | 9/2012 |

(Continued)

OTHER PUBLICATIONS

Doi et al., "Zirconium-Based Compounds for Cathode of Polymer Electrolyte Fuel Cell," Journal of The Electrochemical Society, vol. 154, No. 3, pp. B362-B369, consisting of 8-pages.
(Continued)

*Primary Examiner* — Raymond Alejandro
(74) *Attorney, Agent, or Firm* — Christopher & Weisberg, P.A.

(57) ABSTRACT

Provided is a catalyst which does not corrode at high potentials or in acidic electrolytes of fuel cells, is stable, effectively participates in electrode reactions not only in a three-phase interface of a gas phase (humidified reaction gas) and a liquid phase formed in catalyst particles present on the surface in contact with an electrolyte membrane but also in a three-phase interface in catalyst particles in a catalyst layer present at positions away from the electrolyte membrane, has a high utilization efficiency of catalyst
(Continued)

particles, has a high oxygen reduction ability, provides high characteristics, and is inexpensive compared to platinum. A fuel cell thus obtained has high characteristics and a long life, and is relatively inexpensive and excellent in economic efficiency. There is provided a porous catalyst comprising a sulfur-containing oxycarbonitride containing molybdenum, boron, and the following metal K (at least one metal selected from the group consisting of tantalum, zirconium, copper, iron, tungsten, titanium, vanadium, cobalt, manganese, aluminum, and nickel).

17 Claims, 9 Drawing Sheets

(51) Int. Cl.
*H01M 4/88* (2006.01)
*H01M 8/1004* (2016.01)
*H01M 4/86* (2006.01)

(58) Field of Classification Search
CPC .. H01M 4/881; H01M 4/8825; H01M 4/8878; H01M 8/1004; H01M 2004/8689
See application file for complete search history.

(56) References Cited

U.S. PATENT DOCUMENTS

| | | | | |
|---|---|---|---|---|
| 8,015,823 | B2 * | 9/2011 | Vanderspurt | C10G 51/026 60/777 |
| 8,637,206 | B2 * | 1/2014 | Imai | H01M 4/9016 429/482 |
| 9,278,339 | B2 | 3/2016 | Bellussi et al. | |
| 9,570,757 | B2 | 2/2017 | Wakizaka et al. | |
| 9,975,112 | B2 | 5/2018 | Bellussi et al. | |
| 2007/0281160 | A1 | 12/2007 | Krishna et al. | |
| 2009/0057201 | A1 | 3/2009 | Brait et al. | |
| 2010/0234212 | A1 | 9/2010 | Brait et al. | |
| 2012/0070763 | A1 | 3/2012 | Monden et al. | |
| 2012/0261311 | A1 | 10/2012 | Bellussi et al. | |
| 2014/0186743 | A1 | 7/2014 | Wakizaka et al. | |
| 2016/0101410 | A1 | 4/2016 | Bellussi et al. | |

FOREIGN PATENT DOCUMENTS

| | | | | |
|---|---|---|---|---|
| CN | 103782431 | A | 5/2014 | |
| JP | 2003342058 | A | 12/2003 | |
| JP | 2006147371 | A | 6/2006 | |
| JP | 200731781 | A | 2/2007 | |
| JP | 2007320847 | A | 12/2007 | |
| JP | 2009226311 | A | 10/2009 | |
| JP | 2011194328 | A | 10/2011 | |
| JP | WO2010041650 | A1 | 3/2012 | |
| JP | WO2010041655 | A | 3/2012 | |
| JP | WO2010131636 | A1 | 11/2012 | |
| JP | 2015142882 | A | 8/2015 | |
| JP | WO2016002277 | A1 | 7/2017 | |
| WO | 0174484 | A2 | 10/2001 | |
| WO | 2009058861 | A2 | 5/2009 | |
| WO | WO 2010/41655 | * | 4/2010 | ............ B01J 27/24 |
| WO | 2011039595 | A2 | 4/2011 | |

OTHER PUBLICATIONS

International Search Report and Written Opinion dated Jul. 10, 2018, for corresponding International Application No. PCT/JP2018/015677 filed on Apr. 16, 2018; consisting of 8-pages.
Chinese Office Action dated Jan. 12, 2022, for corresponding Chinese Patent Application No. 2018800275301 consisting of 19-pages.
Chinese Search Repod dated Dec. 24, 2021, for corresponding Chinese Patent Application No. 2018800275301 consisting of 5-pages.

* cited by examiner

POROUS CATALYST, CATALYST LAYER FOR FUEL CELL, ELECTRODE, MEMBRANE ELECTRODE ASSEMBLY AND FUEL CELL, AND METHOD FOR PRODUCING POROUS CATALYST

CROSS-REFERENCE TO RELATED APPLICATIONS

This application is a Submission under 35 U.S.C. § 371 for U.S. National Stage Patent Application of, and claims priority to, International Application Number PCT/JP2018/015677, entitled POROUS CATALYST, CATALYST LAYER FOR FUEL CELL, ELECTRODE, MEMBRANE ELECTRODE ASSEMBLY, FUEL CELL, AND METHOD FOR POROUS CATALYST filed Apr. 16, 2018, which International Application is related to and claims priority to Japanese Application No. 2017-086138 filed Apr. 25, 2017, the entirety of all of which are incorporated herein by reference.

FIELD

The present invention relates to a porous catalyst, a catalyst layer for a fuel cell, an electrode, a membrane electrode assembly and a fuel cell, and a method for producing a porous catalyst.

BACKGROUND

Hereinafter, an example of a fuel cell will be described.

Fuel cells are classified into various types according to the type of electrolyte and the type of electrode, and typical examples thereof include an alkali type, a phosphoric acid type, a molten carbonate type, a solid electrolyte type, and a solid polymer type. Among these, solid polymer fuel cells capable of operating at a low temperature (about −40° C.) to about 120° C. have attracted attention, and have been developed and put into practical use as low-pollution power sources for automobiles in recent years. As applications of the solid polymer fuel cell, a driving source for a vehicle and a stationary power source have been studied, and these applications of fuel cells require durability over a long period of time.

FIG. 9 is an exploded cross-sectional view showing a basic configuration of a unit cell of a conventional solid polymer fuel cell.

A unit cell 4 (membrane/electrode assembly) is configured by closely bonding, by hot pressing, an air electrode-side electrode catalyst layer 2 and a fuel electrode-side electrode catalyst layer 3, which are obtained by carrying noble metal particles [mainly platinum (Pt) or platinum group metals (Ru, Rh, Pd, Os, and Ir)] on carbon black particles, on principal surfaces on both sides of a sheet-like solid polymer electrolyte membrane 1, respectively. An air electrode-side gas diffusion layer (not shown) and a fuel electrode-side gas diffusion layer (not shown) each having a structure in which a mixture of carbon black and polytetrafluoroethylene (PTFE) is coated on carbon paper, carbon woven fabric, or the like are disposed to face the catalyst layer 2 and the catalyst layer 3, respectively. As a result, an air electrode including the air electrode-side electrode catalyst layer 2 and a fuel electrode including the fuel electrode-side electrode catalyst layer 3 are constituted.

These gas diffusion layers supply and discharge oxidizer gases (for example, air) and fuel gases, for example, hydrocarbon fuels such as hydrogen, a natural gas, a city gas, methanol, LPG, butane, etc., and at the same time, have a function serving as a current collector and transmit an electric current to the outside. The unit cell 4 is constituted by being sandwiched between a pair of separators made of an electroconductive and gas-impermeable material, each of which has a gas flow path for reaction gas flow facing the unit cell and a cooling water flow path for cooling water flow on the opposite principal surface.

As the solid polymer electrolyte membrane 1, a cationic conductive membrane made of a polystyrene-based cation exchange membrane having sulfonic acid groups, a mixed membrane of fluorocarbon sulfonic acid and polyvinylidene fluoride, a fluorocarbon matrix grafted with trifluoroethylene, and a fluorine-based ion exchange resin membrane typified by a perfluorosulfonic acid resin (for example, manufactured by DuPont under the trade name Nafion membrane) are used. These solid polymer electrolyte membranes 1 have proton exchange groups in the molecules, and when the water content thereof is saturated, have a specific resistance of 20 Ωcm or less at normal temperature, and function as a proton conductive electrolyte.

When a humidified reaction gas is supplied to each of the electrodes 6 and 7 described above, a three-phase interface of a gas phase (reaction gas), a liquid phase (solid polymer electrolyte membrane), and a solid phase (catalysts possessed by both electrodes) is formed at the boundaries between the catalyst layers 2 and 3, which carry a platinum-based noble metal and are provided on both electrodes, respectively, and the solid polymer electrolyte membrane 1, whereby DC power is generated by causing an electrochemical reaction.

In the aforementioned electrochemical reaction, the following reaction occurs:

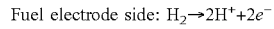

Fuel electrode side: $H_2 \rightarrow 2H^+ + 2e^-$

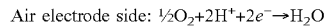

Air electrode side: $\frac{1}{2}O_2 + 2H^+ + 2e^- \rightarrow H_2O$

As a result, $H^+$ ions generated on the fuel electrode 7 side move in the polymer electrolyte membrane 1 toward the air electrode 6 side, and $e^-$ (electrons) move to the air electrode 6 side through external loads.

On the other hand, on the side of the air electrode 6, oxygen contained in the oxidizer gas reacts with $H^+$ ions and $e^-$ migrating from the side of the fuel electrode 7 to generate water. Thus, the solid polymer electrolyte fuel cell generates a direct current from hydrogen and oxygen and also generates water.

As described above, a noble metal is generally used as the catalyst, and among the noble metals, platinum which is stable at high potentials and has a high activity has been mainly used. However, an alternative catalyst has been required to develop because of high price of platinum and limited amount of resources therefor.

In addition, the noble metal used for the surface of the air electrode may be dissolved under an acidic atmosphere, and there is a problem that it is not suitable for applications requiring durability for a long period of time. Therefore, there has been a strong demand for the development of a catalyst which does not corrode in an acidic atmosphere, is excellent in durability, and has a high oxygen reduction ability.

In addition, a three-phase interface between a gas phase (reaction gas) and a liquid phase (solid polymer electrolyte membrane) is formed in platinum catalyst particles (solid phase) (not shown) present in the vicinity of portions where the catalyst layers 2 and 3 carrying a platinum-based noble metal come into contact with the solid polymer electrolyte membrane 1. As a result, the platinum catalyst particles in the vicinity of the interface effectively participate in the electrochemical reaction (electrode reaction). However, such a three-phase interface between the gas phase (reaction gas) and the liquid phase is not formed or is hardly formed in the platinum catalyst particles present in the catalyst layers 2 and 3 at positions away from the solid polymer electrolyte membrane 1, so that the platinum catalyst particles do not effectively participate in the electrochemical reaction (electrode reaction). In the case of the platinum catalyst particles, there are portions which do not effectively participate in such an electrochemical reaction, and there is a problem in terms of utilization efficiency of the platinum catalyst particles. As a result, there has been a problem that high characteristics cannot be achieved.

As a catalyst for replacing platinum, a material containing a nonmetal such as carbon, nitrogen, or boron has recently attracted attention as a catalyst. Materials containing these nonmetals are cheaper and abundant resources therefor are present compared to noble metals such as platinum.

It has been reported that zirconium-based $ZrO_xN$ compounds exhibit oxygen reduction ability (see Non-Patent Literature 1).

Further, oxygen reduction electrode materials containing a nitride of one or more elements selected from the group of Group 4, Group 5, and Group 14 elements in the long periodic table as a platinum substituent material are disclosed (see Patent Literature 1).

However, these materials containing nonmetals have a problem in that a sufficient oxygen reduction ability for practical use as a catalyst is not obtained.

There is disclosed an oxycarbonitride in which a carbide, an oxide, and a nitride are mixed and heated at 500 to 1500° C. under vacuum, inert or non-oxidizing atmosphere (see Patent Literature 2). However, the above-mentioned oxycarbonitride is a material for a ceramic substrate of a thin film magnetic head, and use of this oxycarbonitride as a catalyst has not been studied.

Core-shell ceramic fine particles having a hierarchical porous structure and a method for producing the same by coating a material of an ultra-fine particle core with a material of a shell are disclosed (see Patent Literature 3). However, the use of the material composed of single core-shell ceramic fine particles may provide insufficient characteristics such as catalytic activity, and thus, core-shell ceramic fine particles must be produced by combining two or more materials.

There is disclosed an electrode catalyst for a solid polymer fuel cell comprising a porous thin film made of platinum or a noble metal alloy containing platinum, the porous thin film having two types of pores different from each other (see Patent Literature 4). However, platinum is used as an essential component, and the technique has a problem in terms of price and resource amount.

There is disclosed a niobium-containing oxycarbonitride containing niobium as an essential component (see Patent Literature 5).

Although platinum is useful not only as a catalyst for the fuel cell described above but also as a catalyst for treating exhaust gases or a catalyst for organic synthesis, platinum is expensive and its resource amount is limited. Thus, there has been a demand for the development of catalysts for these applications that can be substituted for platinum catalysts.

CITATION LIST

Patent Literature

Patent Literature 1: Japanese Patent Application Laid-Open No. 2007-031781

Patent Literature 2: Japanese Patent Application Laid-Open No. 2003-342058

Patent Literature 3: Japanese Patent Application Laid-Open No. 2007-320847

Patent Literature 4: Japanese Patent Application Laid-Open No. 2006-147371

Patent Literature 5: Japanese Republication of PCT Patent Application No. 2010/041655

Non-Patent Literature

Non-Patent Literature 1: S. Doi, A. Ishihara, S. Mitsusima, N. Kamiya, and K. Ota, "Journal of The Electrochemical Society," 2007, 154 (3), B362 to B369

SUMMARY

Technical Problem

An object of the present invention is to solve the problems in the conventional technologies, and is a platinum substitute catalyst which does not corrode in an acidic electrolyte or at high potentials, is excellent in durability, and has a high oxygen reduction ability, and a three-phase interface of a gas phase (reaction gas) and a liquid phase is uniformly formed not only in catalyst particles present on a surface in contact with an electrolyte membrane but also in catalyst particles in a catalyst layer present at positions away from the electrolyte membrane. It is an object of the present invention to provide such a catalyst which effectively participates in an electrochemical reaction, has high utilization efficiency of catalyst particles, and provides high characteristics.

Another object of the present invention is to provide a method for easily producing such catalysts.

Another object of the present invention is to provide a catalyst layer for a fuel cell provided with such a catalyst, an electrode having the catalyst layer for a fuel cell and a porous support layer, a membrane electrode assembly having an electrolyte membrane disposed between a cathode and an anode, and a (solid polymer type) fuel cell provided with the membrane electrode assembly.

Solution to Problem

As a result of intensive studies to solve the aforementioned problems of the conventional technologies, the present inventors have found that a catalyst containing a specific sulfur-containing oxycarbonitride does not corrode in an acidic electrolyte or at high potentials, is excellent in durability, has a high oxygen reduction ability, forms a three-phase interface of a gas phase (humidified reaction gas) and a liquid phase not only in catalyst particles present on a surface in contact with an electrolyte membrane but also in catalyst particles in a catalyst layer present at positions away from a surface in contact with the electrolyte membrane, effectively participates in an electrode reaction, and has a high utilization efficiency of the catalyst particles. Further, the present inventors have found that use of the above-mentioned catalyst can effectively allow $H^+$ ions generated on the fuel electrode side to move through the solid polymer electrolyte membrane toward the air electrode side, and as a result, high characteristics as a fuel cell can be obtained.

The porous catalyst according to the present invention includes a sulfur-containing oxycarbonitride containing molybdenum, boron, and the following metal K.

Herein, the metal K is at least one metal selected from the group consisting of tantalum, zirconium, copper, iron, tungsten, titanium, vanadium, cobalt, manganese, aluminum, and nickel.

In addition, in the porous catalyst according to the present invention, it is preferable that the metal K be at least one metal selected from the group consisting of copper, iron, and manganese.

Furthermore, it is preferable that the porous catalyst according to the present invention have a proton conductive site. Further, it is preferable that the porous catalyst according to the present invention be pulverized to form fine particles.

Further, it is preferable that the porous catalysts according to the present invention have a BET specific surface area of 50 m$^2$/g to 80 m$^2$/g.

Further, it is preferable that the porous catalyst according to the present invention is formed in a particle shape, and the particle diameter of the particles is preferably 0.1 µm to 25 µm.

The method for producing a porous catalyst according to the present invention includes the following steps (A) and (B):

(A) heating a starting material containing at least (1) sulfur and/or a sulfur compound selected from an oxide, carbide and nitride thereof, (2) boron and/or a boron compound selected from an oxide, carbide and nitride thereof, (3) molybdenum and/or a molybdenum compound selected from an oxide, carbide and nitride thereof, (4) carbon, and (5) a metal K described below and/or a metal K compound selected from an oxide, carbide and nitride thereof, in a nitrogen gas or an inert gas containing a nitrogen gas to produce a sulfur-containing carbonitride; and (B) heating the sulfur-containing carbonitride obtained in the step (A) in an inert gas containing an oxygen gas to produce a sulfur-containing oxycarbonitride, wherein the metal K is at least one metal selected from the group consisting of tantalum, zirconium, copper, iron, tungsten, titanium, vanadium, cobalt, manganese, aluminum, and nickel.

In the method for producing a catalyst according to the present invention, it is preferable that sulfur be used in the condition (1) of the step (A).

Further, it is preferable that the method for producing a catalyst according to the present invention further include a step of pulverizing the sulfur-containing oxycarbonitride.

Further, in the method for producing a catalyst according to the present invention, it is preferable that the heating temperature in the step (A) and/or (B) be 200° C. to 800° C.

Further, in the method for producing a catalyst according to the present invention, it is preferable that the heating step in the step (A) and/or the step (B) is performed for 5 hours to 10 hours.

The catalyst layer for a fuel cell according to the present invention includes the above-described catalyst.

Further, it is preferable that the catalyst layer for a fuel cell according to the present invention include electron conductive particles having a particle diameter of 3 nm to 500 nm.

The electrode according to the present invention includes the above-described catalyst layer for a fuel cell and a gas diffusion layer.

The membrane electrode assembly according to the present invention includes an anode, a cathode, and an electrolyte membrane disposed therebetween, wherein the cathode is the above-described electrode.

The fuel cell according to the present invention includes the above-described membrane electrode assembly.

Further, the solid polymer fuel cell according to the present invention includes the above-described membrane electrode assembly.

Advantageous Effects of Invention

The catalyst of the present invention does not corrode in an acidic electrolyte or at high potentials and is stable. Further, in the catalyst according to the present invention, since the three-phase interface of the gas phase (humidified reaction gas) and the liquid phase is formed not only in catalyst particles present on the surface in contact with the electrolyte membrane but also in catalyst particles in the catalyst layer present at positions away from the electrolyte membrane, both the catalyst particles present at positions near the interface of the electrolyte membrane and the catalyst particles present at positions away from the electrolyte membrane effectively participate in the electrochemical reaction. Therefore, the catalyst according to the present invention has advantages of high utilization efficiency of the catalyst particles, high oxygen reduction ability, high characteristics, and low cost compared to platinum. Thus, the fuel cell provided with the catalyst has advantages that it has high characteristics and a long life, and is relatively inexpensive and excellent in economic efficiency.

DESCRIPTION OF EMBODIMENTS

Figure 1:
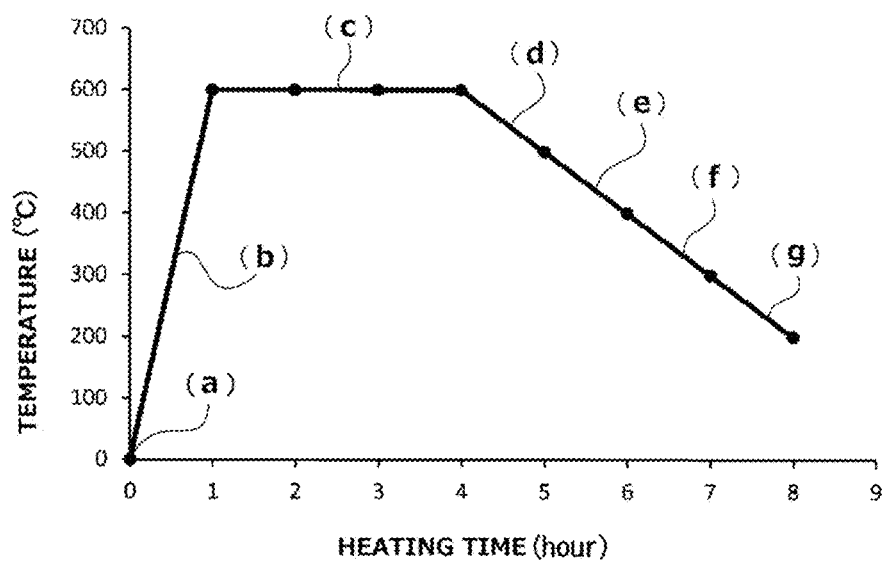
FIG. 1 is a diagram showing an example of the transition of heating temperatures of a catalyst according to the present embodiment.

Catalyst:

The catalyst of the present invention includes a porous sulfur-containing oxycarbonitride.

The porosity of the porous catalyst is, for example, about 75 to 90%, and more preferably about 80 to 90%. When the porosity falls within the aforementioned range, the activity of the catalyst tends to increase, which is preferable. The porosity in the present invention refers to a value obtained by the measurement method described in the examples, which will be described later.

The catalyst of the present invention is preferably pulverized to become fine particles. Catalysts that have been pulverized into fine particles tend to have a high redox ability. Examples of the pulverizing methods may include methods by a jet mill, a vibration mill, a ball mill, a rod mill, an attrition mill, a disk mill, a planetary ball mill, a mortar grinder, a jaw crasher, a beater mill (hammer mill), a mixer mill, a cutting mill, and a super-centrifugal pulverizer. Among these, a pulverizing method by a jet mill or a planetary ball mill is preferable in terms of making the particles finer.

When the catalyst is formed in a particle shape, 90% by mass or more of the particles preferably have a diameter falling in the range of 8 to 13 μm, and more preferably in the range of 5 to 10 μm. When the particle diameter of the catalyst falls within the aforementioned range, the redox ability of the catalyst tends to be increased.

The particle diameter of the catalyst is obtained from the following formula (1). Assuming that the catalyst particles are spherical, the specific surface area obtained by the BET method described later is calculated.

$$D=6/\rho S \quad (1)$$

Where D (μm) is the particle diameter of the catalyst, ρ (g/cm) is the specific gravity of the catalyst, and S (m²/g) is the BET specific surface area of the catalyst.

The catalyst containing a sulfur-containing oxycarbonitride of the present invention contains, in addition to sulfur, carbon, nitrogen, oxygen, boron and molybdenum, at least one metal K selected from the group consisting of tantalum, zirconium, copper, iron, tungsten, titanium, vanadium, cobalt, manganese, aluminum, and nickel. The metal K is preferably at least one metal selected from the group consisting of copper, iron, and manganese, and more preferably at least one metal selected from the group consisting of copper and manganese. A plurality of types of the metal K may be used in combination.

In the present invention, the compositional formula of the catalysts containing a sulfur-containing oxycarbonitride is represented by $S_aMoK_bB_cC_xN_yO_z$. The atomic ratios in the formula may be suitably set in terms of molybdenum (Mo) being 1 such that a for sulfur (S) is 0.05 to 20, and preferably 0.1 to 10; b for the metal K, for example, manganese, iron and copper is 0.05 to 200, and preferably 0.1 to 100; c for boron (B) is 0.1 to 15, and preferably 0.5 to 9; x for carbon (C) is 1 to 15, and preferably 3 to 9; y for nitrogen (N) is 0.001 to 5, and preferably 0.01 to 2; z for oxygen (O) is 0.001 to 50, and preferably 0.01 to 50.

When a plurality of types of the metal K are used in combination, each of them may fall within the corresponding range described above.

More specifically, the aforementioned catalyst containing a sulfur-containing oxycarbonitride includes a sulfide of metal K, an oxide of metal K, a carbide of metal K, a nitride of metal K, a carbonitride of metal K, a carbonate of metal K, a nitride oxide of metal K, an oxide of molybdenum, a sulfide of molybdenum, a carbide of molybdenum, a nitride of molybdenum, a carbonitride of molybdenum, a carbonate of molybdenum, a nitride oxide of molybdenum, a sulfide of boron, an oxide of boron, a carbide of boron, a nitride of boron, a carbonitride of boron, a carbonate of boron, a nitride oxide of boron, an oxide containing metal K and molybdenum or further containing boron, a carbide containing metal K and molybdenum or further containing boron, a nitride containing metal K and molybdenum or further containing boron, a carbonitride containing metal K and molybdenum or further containing boron, a carbonate containing metal K and molybdenum or further containing boron, and a nitride oxide containing metal K and molybdenum or further containing boron, and means a composition represented by a compositional formula of $S_aMoK_bB_cC_xN_yO_z$ as a whole.

Among these, it is preferable that the catalyst contain oxides of manganese, copper, iron, and manganese having oxygen defects, and in particular, when the catalyst contains an oxide of manganese, the oxygen reduction ability of the obtained catalyst tends to be high, which is preferable.

Further, if the catalyst containing a sulfur-containing oxycarbonitride of the present invention has a proton conductive site (for example, if it has a proton conductive site represented by an oxide of sulfur ($SO_3^-$)), it is considered that a three-phase interface of a gas phase (reactive gas) and a liquid phase is uniformly formed not only in the catalyst particles present on the surface in contact with the electrolyte membrane but also in the catalyst particles in the catalyst layer present at positions away from the electrolyte membrane. As a result, $H^+$ ions generated on the fuel electrode side can move toward the air electrode side after passing through the solid polymer electrolyte membrane to the air electrode side, and then move toward the air electrode inner side, thereby effectively participating in the electrode reaction from the air electrode surface to the inner side thereof. Therefore, the utilization efficiency of the catalyst particles is increased, and high characteristics can be obtained.

It is preferable that, when the sulfur-containing oxycarbonitride is measured by a fully automatic horizontal multipurpose X-ray diffraction apparatus, two or more diffraction line peaks are observed within a range of the diffraction angle 2θ of 10° to 90°.

The diffraction line peak refers to a peak obtained at a specific diffraction angle and diffraction intensity when X-rays are irradiated onto a sample (crystalline) at various angles. In the present invention, a signal which can be detected when the ratio (S/N) of the signal (S) to the noise (N) is 2 or more is regarded as one diffraction line peak.

The X-ray diffraction method can be performed using, for example, a fully automated horizontal-type multipurpose X-ray diffraction device: Rigaku Smart Lab as the measurement device, and the measurement can be performed under the following conditions: X-ray power (Cu-Kα): 40 kV, 150 mA, scan axis: θ/2θ, measurement range (2θ): 10° to 89.98°, measurement mode: FT, reading width: 0.02°, incident slit width: ⅔°, width of the receiving slit 1: 13.000 mm, and width of the receiving slit 2: 13.000 mm.

It is considered that a phase containing sulfur and an oxide of metal K (for example, the aforementioned oxides of manganese, copper, iron, and the like) is present in the sulfur-containing oxycarbonitride. Since any of the metal K having such an oxygen defect exists in the catalyst, it is presumed that the finally obtained catalyst has a high oxygen reduction ability.

In addition, it is presumed that the intervention of carbon or nitrogen changes the electron density around sulfur and improves the catalytic activity. Alternatively, it is also presumed that the electron conductivity is improved by the intervention of carbon or nitrogen.

The oxygen reduction starting potential of the catalyst used in the present invention, which is measured according to the measuring method (A) described below, is preferably 0.7 V or higher with respect to the reversible hydrogen electrode.

[Measurement method (A): the catalyst and carbon are added in a solvent so that the catalyst is dispersed in the carbon, which is an electron conductive particle, to give 1% by mass, and stirred to obtain a suspension. Carbon black (particle diameter: 26 to 30 nm, carbon black manufactured by Mitsubishi Chemical Corporation) is used as the carbon source, and the catalyst, carbon, and fluorine resin are dispersed in a mass ratio of 72:25:3. Ethylene glycol dimethyl ether:water (mass ratio)=2:1 is used as the solvent.

The suspension is applied on a carbon sheet electrode (2 cm×2 cm) and hot press dried at 50° C. to 80° C. for 5 minutes to 10 minutes. By drying, a catalyst layer for a fuel cell containing the catalyst is formed on the carbon sheet electrode.

Then, 10 μl of NAFION (registered trademark) (5% NAFION (registered trademark) solution (DE521) available from DuPont) diluted 10 times with isopropyl alcohol is further dropwisely added onto the catalyst layer for a fuel cell. The resulting product is dried at 120° C. for 1 hour.

Using the thus obtained electrodes, a fuel cell kit using hydrogen fuel (fuel cell assembly kit Pem Master (registered trademark) PEM-004 manufactured by Chemix Corporation) is produced. Further, a platinum catalyst is used as an anode, and a carbon sheet electrode after the application of the catalyst is used as a cathode, and an oxygen reduction starting potential of the aforementioned fuel cell is measured using a charging/discharging device (HJR-110mSM6 manufactured by Hokuto Denko Corp.). The flow rate of hydrogen on the fuel electrode side was 0.2 to 0.4 l/min. If the oxygen reduction starting potential is less than 0.7 V, hydrogen peroxide may be generated in some cases when the catalyst is used as a catalyst for a cathode of a fuel cell. The oxygen reduction starting potential is preferably 0.85 V or higher in order to suitably reduce oxygen. The higher the oxygen reduction starting potential is, the more preferable it is, and the theoretical value of the upper limit is 1.23 V although there is no particular upper limit.

The catalyst layer for a fuel cell of the present invention using the above-described catalyst is preferably used at a potential of 0.7 V or higher in an acidic electrolyte, and the upper limit of the potential is determined on the basis of the stability of the electrodes. The catalyst layer can be used up to about 1.23 V at which oxygen may be generated.

When this potential is less than 0.7 V, there is no problem from the standpoint of stabilization of the sulfur-containing oxycarbonitride. In this case, however, oxygen cannot be suitably reduced, and the utility of the membrane electrode assembly included in the fuel cell as a catalyst layer for a fuel cell is poor.

The BET specific surface area of the catalyst is preferably 50 $m^2/g$ to 80 $m^2/g$, and more preferably 45 $m^2/g$ to 75 $m^2/g$. When the BET specific surface area is less than 1 $m^2/g$, the catalytic area is small, and when the BET specific surface area is larger than 1000 $m^2/g$, the catalyst may be easily agglomerated and thus difficult to handle.

The value of the BET specific surface area in the present invention can be measured by a commercially available BET measuring device, for example, a pore distribution measuring device AUTOSORB-1-C manufactured by Qantarom Corporation.

Method for Producing Catalyst:

The method for producing the above-described catalyst is not particularly limited, and examples thereof may include a production method including the steps of: first producing a sulfur-containing carbonitride by a step A; and then heating the produced sulfur-containing carbonitride by a step B in an inert gas containing an oxygen gas to obtain a sulfur-containing oxycarbonitride.

The sulfur-containing oxycarbonitride obtained by such a production method preferably has a porosity of 75% to 90%, and the catalyst containing the sulfur-containing oxycarbonitride tends to have a high redox ability.

Step A: Method for Producing Sulfur-Containing Carbonitride:

In the present invention, as Step A, a starting material containing at least (1) sulfur and/or a sulfur compound selected from an oxide, carbide and nitride thereof, (2) boron and/or a boron compound selected from an oxide, carbide and nitride thereof, (3) molybdenum and/or a molybdenum compound selected from an oxide, carbide and nitride thereof, (4) carbon, and (5) the metal K described above and/or a metal K compound selected from an oxide, carbide and nitride thereof is heated in a nitrogen atmosphere or an inert gas containing nitrogen to produce a sulfur-containing carbonitride.

As a method for obtaining the sulfur-containing carbonitride used in the above-described step, the following methods may be mentioned:

(I) A method of producing a sulfur-containing carbonitride by heating a mixture of sulfur, molybdenum oxide, boron, carbon and an oxide of the metal K in a nitrogen atmosphere or an inert gas containing nitrogen;
(II) A method of producing a sulfur-containing carbonitride by heating a mixture of sulfur, molybdenum oxide, molybdenum carbide, molybdenum nitride, boron, carbon, and an oxide of the metal K in an inert gas such as a nitrogen gas;
(III) A method of producing a sulfur-containing carbonitride by heating the aforementioned metal K-containing compound (for example, an organic acid salt, a chloride, a carbide, a nitride, a complex, etc.), and a mixture of sulfur, molybdenum oxide, molybdenum carbide, molybdenum nitride, boron, and carbon in an inert gas such as a nitrogen gas; and
(IV) A method of producing a sulfur-containing carbonitride by heating a mixture of starting materials in the above-mentioned production methods (I) to (III) and other materials in an inert gas such as a nitrogen gas.

In the present invention, there is no particular limitation imposed thereon as long as a sulfur-containing carbonitride can be obtained, and any production method may be used as the step A.

Among these, the method (I) for producing a sulfur-containing carbonitride by heating a mixture of sulfur, molybdenum oxide, boron, carbon, and an oxide of the metal K in a nitrogen atmosphere or an inert gas containing nitrogen.

The starting materials and other materials in the aforementioned production methods (I) to (III) are mixed in a powder form. However, before the heating operation of the step A, it is preferable that the component particles be sufficiently homogenized in advance. The degree of the component homogenization is preferably, for example, a mixing state at a level at which a mechanical alloying phenomenon referred to in the metallurgy field can occur, which means mixing and amorphization on an atomic basis by a stress applied to a solid.

Examples of the specific operations may include milling operations by methods using a jet mill, a vibrating mill, a ball mill, a rod mill, an attrition mill, a disk mill, a planetary ball mill, a mortar grinder, a jaw crusher, a beater mill (hammer mill), a mixer mill, a cutting mill, and a supercentrifugal pulverizer. Among these, the pulverizing and mixing method using a jet mill or a planetary ball mill is preferable in terms of having an effect of making respective particles finer and uniform. At the time of milling, milling is performed under vacuum or in a medium such as an inert gas, and in this case, heat may be generated at a predetermined level due to frictional heat, but cooling can be appropriately performed. The milling time is appropriately determined, but for uniformization of the components, the milling time may be as long as 1 hour to several tens of hours. It is preferably 5 hours or longer.

As will be described later, after the heating step of the step A or the step B, an operation for crushing or pulverizing the solidified body obtained by heating is performed, and there may be adopted a method similar to the above-mentioned milling method, for example. However, the above-mentioned milling basically differs from these pulverizing and crushing methods after heating, and not only is simply to perform pulverizing, but is also performed to sufficiently homogenize the components of respective particles. Thus, it is usual that milling is performed for a much longer period of time simply by focusing at the operation time of the milling.

By the above-mentioned milling, particles which become finer and have a uniform component are obtained, and thus, are subjected to the heating operation of the step A.

The heating temperature in the production of the sulfur-containing carbonitride in the step A is in the range of 200° C. to 1000° C., and preferably in the range of 400° C. to 800° C. The heating temperature falling within the aforementioned range is preferable in terms of good crystallizability and uniformity of the resulting sulfur-containing carbonitride. If the heating temperature is lower than 400° C., the crystallizability of the sulfur-containing carbonitride tends to be poor and non-uniform. If the temperature exceeds 1000° C., sintering excessively progresses, and a desired composition (mixture) tends not to be obtained.

Examples of sulfur and/or the sulfur compounds selected from its oxide, carbide and nitride as the starting material (1) may include inorganic sulfur compounds such as, in addition to elemental sulfur, sulfur monoxide SO, sulfur dioxide $SO_2$, sulfur trioxide $SO_3$, sulfur hexafluoride $SF_6$, carbon disulfide $CS_2$, copper sulfide, iron sulfide, manganese sulfide, and molybdenum sulfide. Preferably, the starting material (1) is elemental sulfur.

Examples of boron and/or the boron compounds selected from its oxide, carbide and nitride as the starting material (2) may include, in addition to elemental boron, boron oxide $B_2O_3$, boron nitride BN, and boron trifluoride $BF_3$. Preferably, the starting material (2) is elemental boron.

Examples of molybdenum and/or the molybdenum compounds selected from its oxide, carbide and nitride as the starting materials (3) may include, in addition to elemental molybdenum, molybdenum (IV) oxide $MoO_2$, molybdenum (VI) oxide $MoO_3$, molybdenum (IV) sulfide $MoS_2$, molybdenum (VI) sulfide $MoS_3.2H_2O$, molybdenum boride MoB, and molybdenum (II) boride $Mo_2BO_3$. Whichever molybdenum compound is used, the catalyst containing a sulfur-containing oxycarbonitride finally obtained has a high oxygen reduction starting potential.

In addition, examples of molybdenum carbide as a starting material may include $Mo_2C$. Further, examples of molybdenum nitride as the starting material may include MoN.

The preferred starting material (3) is molybdenum (VI) oxide $MoO_3$.

As the carbon of the starting material (4), either crystallizable or amorphous carbon may be used, and examples thereof may include, in addition to carbon black as amorphous carbon, graphite, black lead, activated carbon, carbon nanotube, carbon nanofiber, carbon nanohorn, and fullerene as crystallizable carbon. The smaller the particle diameter of the carbon powder, the larger the specific surface area, and the easier the reaction with the oxide proceeds, which is preferable. However, there may also be a suitable range for the particle diameter, of which example may be a range of 10 nm to 50 nm, and further a range of 26 nm to 30 nm.

Further, amorphous carbon is preferable, and, for example, carbon black is particularly preferable.

In consideration of the aforementioned particle diameter, carbon black having a particle diameter range of 10 nm to 50 nm is more preferable as the preferable carbon. Appropriate selection of carbon leads to an improvement in the redox ability as a catalyst.

Examples of the oxides of the metal K of the starting material may include metals including tantalum oxide, zirconium oxide, copper oxide, iron oxide, tungsten oxide, titanium oxide, vanadium oxide, cobalt oxide, manganese oxide, aluminum oxide, boron oxide, and nickel oxide. The oxide of the metal K may be used in combination of two or more selected types.

An organic acid salt, a carbonate, a chloride, an organic complex, a carbide, a nitrides and the like of metal K may also be used. One or two or more types of selected compounds of the metal K may be used in combination.

Preferably, the metal K is at least one metal of manganese, copper, and iron, and more preferably is at least one metal of manganese and copper.

Examples of manganese may include, in addition to elemental manganese, manganese dioxide $MnO_2$, manganese (II.III) oxide $Mn_3O_4$, manganese (II) oxide MnO, manganese (III) oxide $Mn_2O_3$, manganese (VI) oxide $MnO_3$, manganese (VII) oxide $Mn_2O_7$, manganese (II) sulfate monohydrate $MnSO_4.H_2O$, manganese (II) sulfate tetrahydrate $MnSO_4.4H_2O$, manganese (II) sulfate pentahydrate $MnSO_4.5H_2O$, and manganese sulfide MnS. Manganese (II.III) oxide $Mn_3O_4$ is particularly preferable.

Examples of copper may include, in addition to elemental copper, copper (I) oxide $Cu_2O$, copper (II) oxide CuO, copper (I) sulfide $Cu_2S$, copper (II) sulfide CuS, and copper sulfate $CuSO_4$. Copper (II) oxide CuO is particularly preferable.

Examples of iron may include, in addition to elemental iron, iron (II) oxide FeO, iron tetraoxide $Fe_3O_4$, iron (II) sulfide FeS, iron (II) sulfate $FeSO_3$, and iron (III) sulfate $Fe_2(SO_4)_3$. Iron tetraoxide $Fe_3O_4$ is particularly preferable.

Controlling the added amounts (molar) of the starting materials provides a suitable sulfur-containing carbonitride. When a suitable sulfur-containing carbonitride is used, there is a tendency to obtain a sulfur-containing oxycarbonitride which has a high oxygen reduction starting potential and is active.

The added amounts of the respective materials relating to molybdenum (Mo), sulfur (S), and metal K are preferably 0.1 to 20 mol of sulfur (S) and 0.1 to 40 mol of metal K (for example, Fe, Cu, Mn, etc.) with respect to 1 mol of molybdenum (Mo) in terms of atomic conversion molar ratio.

The added amount of boron as a boron atom is 0.1 wt % to 10 wt % with respect to the total of Mo, S and metal K.

The added amount of carbon as a carbon atom is such that it becomes 1 wt % to 30 wt % with respect to the total amount.

As the reaction amounts of the nitrogen atoms and the oxygen atoms, an amount by which the nitrogen gas or the oxygen gas supplied as the atmosphere gas reacts under a predetermined temperature condition in the nitriding step and the oxidizing step is sufficient.

Crushing Process of Sulfur-Containing Carbonitride:

The sulfur-containing carbonitride obtained in the above-described step A may be crushed and subjected to the next step B. The catalyst finally obtained by crushing may be made into a finer powder, so that a catalyst layer in which the catalyst is suitably dispersed can be obtained. Further, it is preferable because it has a large catalytically active area and is excellent in catalytic ability.

Examples of the method of crushing the obtained sulfur-containing carbonitride may include a roller rolling mill, a ball mill, a medium stirring mill, an airflow pulverizer, a mortar, and a tank digester. An airflow pulverizer is preferable in terms of being able to make the sulfur-containing carbonitride finer, and a method using a mortar is preferable in terms of facilitating a small amount of processing.

Step B: Step of Producing Sulfur-Containing Oxycarbonitride from Sulfur-Containing Carbonitride:

Next, a sulfur-containing oxycarbonitride is obtained by a heating method including a step of heating, in an atmosphere containing an oxygen gas or an inert gas containing an oxygen gas (for example, air may be used) in Step B, a sulfur-containing carbonitride obtained by heating in nitrogen or an inert gas atmosphere containing a nitrogen gas as described above. The step will be described below.

Examples of the inert gas may include a nitrogen gas, a hydrogen gas, a helium gas, a neon gas, an argon gas, a krypton gas, a xenon gas, and a radon gas. A nitrogen gas, an argon gas, or a helium gas is particularly preferred because of their relative availability.

The oxygen gas concentration in the inert gas depends on the heating time and the heating temperature, but is preferably 0.1 to 5% by volume, and particularly preferably 0.1% to 4% by volume. The concentration of the oxygen gas falling within the aforementioned range is preferable in terms of forming a uniform oxycarbonitride. If the oxygen gas concentration is less than 0.1% by volume, an unoxidized state tends to occur, and if the oxygen gas concentration exceeds 5% by volume, the oxidation tends to proceed excessively. The oxygen gas may be used by appropriately diluting pure oxygen from such as a cylinder or atmospheric oxygen.

The heating temperature in this step is usually in the range of 200° C. to 1000° C., and preferably in the range of 400° C. to 800° C. The heating temperature falling within the aforementioned range is preferable because a uniform oxycarbonitride is formed. If the heating temperature is lower than 200° C., oxidation and sintering tend not to proceed, and if it exceeds 1000° C., oxidation and sintering tend to proceed excessively.

Examples of the heating method in this step may include a stationary method, a stirring method, a microwave method, a dropping method, and a powder trapping method. The stationary method is a method in which a sulfur-containing carbonitride is placed in a stationary electric furnace or the like and heated. In addition, there is also a method in which an alumina board, a quartz board, or the like on which sulfur-containing carbonitride has been weighed is placed and heated.

A microwave may be used by a microwave oven or the like. First, the corresponding mixture is sandwiched between carbon sheets or the like and heated at 600 W. The heating time is 1 second to 1 minute, and preferably 1 second to 30 seconds. If water is sprayed on the carbon sheet at that time, steam heating can be performed, which is preferable from the viewpoint of being able to perform more uniform firing.

The stirring method is a method in which a sulfur-containing carbonitride is put in an electric furnace such as a rotary kiln and the like and heated while stirring the sulfur-containing carbonitride. In the case of the stirring method, a large amount of sulfur-containing carbonitride can be heated, so that agglomeration and growth of particles of sulfur-containing carbonitride can be suppressed, which is preferable.

In a stationary electric furnace, the starting material is put and heated in a nitrogen atmosphere or an inert gas containing nitrogen to produce a sulfur-containing carbonitride, and then the sulfur-containing carbonitride in the electric furnace as it is transferred into an inert gas atmosphere containing an oxygen gas (using the atmosphere). Additional heating can provide a sulfur-containing oxycarbonitride.

Referring to FIG. 1, an example of a step of producing a sulfur-containing oxycarbonitride (firing step) according to the present embodiment will be described. FIG. 1 shows a heating profile to the starting material when using a heating furnace. In FIG. 1, the vertical axis represents the temperature in the heating furnace (° C.), and the horizontal axis represents the heating time (hr).

In the method described here, a nitrogen gas is introduced into a heating furnace and the inside of the furnace is depressurized to produce a sulfur-containing carbonitride, and then the heating furnace is naturally or forcibly cooled while introducing an oxygen-containing gas such as air into the heating furnace to obtain the sulfur-containing oxycarbonitride of the present invention. Alternatively, a sequential production method in which once the sulfur-containing carbonitride compound is produced, and it is oxidized separately to produce the sulfur-containing oxycarbonitride of the present invention may be used.

(a) in FIG. 1: specific starting materials containing at least (1) sulfur and/or a sulfur compound selected from an oxide, carbide and nitride thereof, (2) boron and/or a boron compound selected from an oxide, carbide and nitride thereof, (3) molybdenum and/or a molybdenum compound selected from an oxide, carbide and nitride thereof, (4) carbon, and (5) a metal K described above and/or a metal K compound selected from an oxide, carbide and nitride thereof are put in a stationary electric furnace (tabletop gas convertible vacuum furnace KDF-75 manufactured by Denken-Highdental Co., Ltd., inner width: 120 mm, inner height: 90 mm, depth: 2200 mm, and volume: 2.4 L) at normal temperature and normal pressure. Then, the vacuum pump is operated to vacuum up the inside of the furnace to reduce the pressure to −100 kPa.

(b) in FIG. 1: After the heating is started at a temperature rising rate of 10° C./min, the furnace is heated to 600° C. over 1 hour, and after 10 minutes from the start, a nitrogen gas is introduced into the furnace at a flow rate of 1 L/min.

(c) in FIG. 1: Reaction is continued by heating controlled at 600° C. for 3 hours in a nitrogen gas atmosphere to obtain a sulfur-containing carbonitride.

(d) in FIG. 1: Heating of the furnace is stopped, and while the sulfur-containing carbonitride produced in the electric furnace is kept as it is, the on-off valve provided in the electric furnace is opened for about 20 minutes, so as to introduce an inert gas (atmosphere) containing an oxygen gas at normal temperature and pressure. After the introduction, the temperature of the furnace is controlled so as to drop to 500° C. in 1 hour.

(e) in FIG. 1: The on-off valve provided in the electric furnace is opened again for about 20 minutes to introduce an inert gas (atmosphere) containing an oxygen gas at normal temperature and pressure. Then the temperature of the furnace is controlled so as to drop to 400° C. in 1 hour.

(f) in FIG. 1: The on-off valve provided in the electric furnace is opened again for about 20 minutes to introduce an inert gas (atmosphere) containing an oxygen gas at normal temperature and pressure. After the introduction, the temperature of the furnace is controlled so as to drop to 300° C. in 1 hour.

As described above, an inert gas (atmosphere) containing an oxygen gas is introduced into the furnace several times to cool the furnace to a normal temperature while gradually lowering the temperature at a predetermined gradient to obtain the sulfur-containing oxycarbonitride of the present invention (see (g) in FIG. 1).

Method of Crushing Sulfur-Containing Oxycarbonitride:

For example, the sulfur-containing oxycarbonitride obtained by the above-described production method may be used as it is, but it is preferable to further pulverize the obtained sulfur-containing oxycarbonitride and make it finer particles. Catalysts containing the sulfur-containing oxycarbonitrides that have been pulverized and made finer particles tend to have higher redox ability. Usually, the purpose of this crushing is simply to crush the material and make it finer particles, and therefore, the crushing may be performed to such a degree as a minimum.

Examples of the methods of pulverizing the sulfur-containing oxycarbonitrides may include methods by a jet mill, a vibration mill, a ball mill, a rod mill, an attrition mill, a disk mill, a planetary ball mill, a mortar grinder, a jaw crasher, a beater mill (hammer mill), a mixer mill, a cutting mill, and a super-centrifugal pulverizer. Among these, a pulverizing method using a jet mill or a planetary ball mill is preferable in terms of making the particles finer.

When the obtained sulfur-containing oxycarbonitride is pulverized to form fine particles, the particle diameter of 90% by mass or more of the fine particles is preferably in the range of 8 μm to 13 μm, and more preferably in the range of 5 μm to 10 μm. When the particle diameter of the sulfur-containing oxycarbonitride falls within the aforementioned range, the redox ability of the catalyst containing the sulfur-containing oxycarbonitride tends to be high.

The features of the above-mentioned steps A and B of the present application reside in firing sulfur and carbon at a relatively low temperature in the presence of a nitrogen gas to once produce a sulfur-containing carbonitride containing various metals in addition to boron. Since it is fired in an inert gas, carbon and the like are not burned, but are incorporated into the matrix together with other metal atoms to obtain a sulfur-containing carbonitride. The sulfur-containing carbonitride is then oxidized with an oxygen gas to obtain a sulfur-containing oxycarbonitride. The obtained sulfur-containing oxycarbonitride is a porous body in which fine crystals are aggregated. The heating in the steps A and B is performed at relatively low temperature, so that the reaction proceeds under partial melting or below the melting point of respective components, which can be referred to as sintering from a phenomenon standpoint. The product obtained by the operation of both steps A and B is homogeneous because the particles of respective starting materials are sufficiently made finer and homogenized in advance before the heating reaction of the step A, although it is not treated at a high temperature enough to completely melt all the components and is sintered as a phenomenon.

The catalyst of the present invention is a material containing, as constituent atoms, sulfur (S), carbon (C), nitrogen (N), oxygen (O), boron (B), molybdenum (Mo), and any of the metal atoms contained in the metal K, and is produced through the above-mentioned steps A and B.

Through the above-described steps A and B, an effective function as a redox catalyst of the fuel cell is exhibited. The effectiveness as a redox catalyst in the fuel cell of the present invention is comparable to conventionally used platinum catalysts for fuel cells.

Application:

The catalyst of the present invention can be used as an alternative catalyst to platinum catalysts. For example, the catalyst of the present invention can be used as a positive electrode catalyst for a fuel cell and a positive electrode catalyst for a metal-air cell. The positive electrode catalyst for a fuel cell and the positive electrode catalyst for a metal-air cell can be produced by a conventional method. Hereinafter, a production method for a positive electrode catalyst for a fuel cell and a positive electrode catalyst for a metal-air cell will be exemplified, but the method is not limited thereto.

The positive electrode catalyst layer for a fuel cell of the present invention is characterized in including the aforementioned catalyst. Since the catalyst is excellent in durability and has a large oxygen reduction ability, it is preferable to use the catalyst in the positive electrode catalyst layer.

The catalyst layer for a fuel cell of the present invention preferably further contains electron conductive particles. When the catalyst layer for a fuel cell containing the catalyst further contains electron conductive particles, the reduction current can be further increased. It is believed that the electron conductive particles provide an electrical contact to the catalyst to induce an electrochemical reaction, thereby increasing the reduction current.

The electron conductive particles are usually used as a carrier for a catalyst. Examples of the electron conductive particles may include carbon, an electroconductive polymer, a metal and an electroconductive inorganic oxide such as titanium oxide, tin oxide, and indium oxide, and these can be used alone or in combination. In particular, since carbon has a large specific surface area, carbon alone or a mixture of carbon and other electron conductive particles is preferable. That is, the catalyst layer for a fuel cell preferably contains the catalyst and carbon.

Examples of carbon may include carbon, carbon black, graphite, black lead, activated carbon, carbon nanotube, carbon nanofiber, carbon nanohorn, and fullerene. The smaller the particle diameter of the carbon powder, the larger the specific surface area, and the easier the reaction with the oxide, which is preferable. For example, carbon black (particle diameter: 26 nm to 30 nm, carbon black manufactured by Mitsubishi Chemical Corporation) is suitably used.

Too small particle diameter of carbon is difficult to form an electron conduction path, and too large particle diameter tends to lower the gas diffusivity of the catalyst layer for a fuel cell, or the utilization rate of the catalyst. Thus, the particle diameter of carbon is preferably in the range of 1 nm to 1000 nm, and more preferably in the range of 10 nm to 100 nm.

When the electron conductive particles are carbon, the mass ratio (catalyst:electron conductive particles) of the catalyst to carbon is preferably 3:1 to 500:1, more preferably 4:1 to 300:1, and more preferably 4:1 to 200:1.

Examples of the electroconductive polymer may include, but are not limited to, polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline, and polyphenylquinoxaline. Among these, polypyrrole, polyaniline, and polythiophene are preferable, and polypyrrole is more preferable.

The polymer electrolyte is not particularly limited as long as it is generally used in a catalyst layer for a fuel cell. Specifically, perfluorocarbon polymers having a sulfonic acid group (for example, NAFION (registered trademark) (such as 5% NAFION (registered trademark) solution (DE521) available from DuPont) are preferred.

The catalyst layer for a fuel cell of the present invention can be used as a positive electrode catalyst layer. Since the catalyst layer for a fuel cell of the present invention has a high oxygen reduction ability and contains a catalyst which is difficult to corrode even at high potentials in an acidic electrolyte, it is useful as a catalyst layer (catalyst layer for a cathode) provided in a positive electrode of a fuel cell. In particular, it is suitably used for a catalyst layer provided on a cathode of a membrane electrode assembly provided in a solid polymer fuel cell.

The electrode of the present invention is characterized by having the catalyst layer for a fuel cell and a porous support layer.

Since the electrode of the present invention is excellent in durability and has a large catalytic ability, it is more effective when it is used for a cathode.

The porous support layer is a layer that diffuses gases (hereinafter referred to as a "gas diffusion layer"). The gas diffusion layer may be any layer as long as it has electron conductivity, high gas diffusivity, and high corrosion resistance, but generally, carbon-based porous materials such as carbon paper and carbon cloth, or aluminum foil with which stainless steel and corrosion resistance material are coated for weight reduction are used.

The membrane electrode assembly of the present invention is a membrane electrode assembly including a platinum catalyst as an anode and an electrolyte membrane disposed between the anode and the cathode, and the cathode is the electrode described above.

The electrolyte membrane is not particularly limited as long as it is generally used in a catalyst layer for a fuel cell. Specifically, perfluorocarbon polymers having a sulfonic acid group (for example, NAFION (registered trademark) (such as 5% NAFION (registered trademark) solution (DE521) available from DuPont) are preferred.

The fuel cell of the present invention is characterized in that the membrane electrode assembly is provided. The electrochemical reaction of a fuel cell occurs at a so-called three-phase interface (electrolyte-electrode catalyst-reactive gas). Fuel cells are classified into several types depending on the difference in electrolyte used, and examples of fuel cells may include a molten carbonate type (MCFC), a phosphoric acid type (PAFC), a solid oxide type (SOFC), and a solid polymer type (PEFC). Among these, the membrane electrode assembly of the present invention is preferably used in a solid polymer electrolyte fuel cell.

EXAMPLES

The present invention will next be described in more detail by way of examples, but the invention is not limited to these examples. Various measurements in Examples and Comparative Examples were performed by the following methods.
Analysis Method:
1. X-Ray Diffraction Spectrum
Powder X-ray diffraction of the sample was performed using a fully automatic horizontal multi-purpose X-ray diffraction apparatus "SmartLab" manufactured by Rigaku Corporation.

2. BET Specific Surface Area Measurement
The measurement was performed using "AUTOSORB-1-C" manufactured by Qantachrome Co., Ltd. as a pore distribution measuring device.
3. Measurement of Particle Diameter
The measurement was performed using "HORIBA LA-920" manufactured by Horiba, Ltd. as a laser diffraction/scattering type particle diameter distribution measuring device.
4. Measurement of Porosity
The measurement was performed using a powder/solid/foam true volume and true density measuring device "PentaPycnometer" manufactured by Yuasa Ionics.

First, an experimental result (oxygen reduction starting potential) of a sample (Examples 1 to 10) using sulfur (S) as a starting material will be described. In Examples 1 to 10, the list of the starting materials and the added amounts thereof are as shown in Table 1 below.

TABLE 1

| | | | | | Unit: g |
|---|---|---|---|---|---|
| | Sulfur | Molybdenum oxide | Oxide of metal K | Boron | Carbon |
| Example 1 | 0.24 | 0.21 | 4.57 Manganese oxide | 0.15 | 1.05 |
| Example 2 | 0.24 | 0.21 | 2.86 Copper oxide | 0.10 | 0.45 |
| Example 3 | 0.24 | 0.21 | 4.63 Iron oxide | 0.15 | 1.05 |
| Example 4 | 0.24 | 0.21 | 1.59 Titanium oxide | 0.06 | 0.40 |
| Example 5 | 0.24 | 0.21 | 4.81 Cobalt oxide | 0.15 | 1.05 |
| Example 6 | 0.24 | 0.21 | 4.63 Tungsten oxide | 0.15 | 1.05 |
| Example 7 | 0.24 | 0.21 | 5.31 Niobium oxide | 0.17 | 1.26 |
| Example 8 | 0.24 | 0.21 | 8.83 Tantalum oxide | 0.27 | 2.00 |
| Example 9 | 0.24 | 0.21 | 1.49 Nickel oxide | 0.05 | 0.40 |
| Example 10 | 0.24 | 0.21 | 2.69 Tin oxide | 0.09 | 0.45 |

As sulfur, molybdenum oxide, manganese oxide, copper oxide, iron oxide, titanium oxide, cobalt oxide, tungsten oxide, niobium oxide, tantalum oxide, nickel oxide, and tin oxide shown in Table 1, those manufactured by Wako Pure Chemical Industries, Ltd. were used. As boron shown in Table 1, a reagent grade boron was used. Further, as the carbon shown in Table 1, carbon black (particle diameter: 26 nm to 30 nm) manufactured by Mitsubishi Chemical Corporation was used.

In Examples 1 to 10, each of the starting materials shown in Table 1 was milled for 10 hours using a planetary milling. The milled materials were then mixed. The powder raw material uniformly mixed by milling was put into a stationary electric furnace (a tabletop gas convertible vacuum furnace KDF-75 manufactured by Denken-Highdental Co., Ltd., inner width: 120 mm, inner height: 90 mm, depth: 2200 mm, and volume: 2.4 L) at normal temperature and normal pressure.

Thereafter, a vacuum pump provided in the electric furnace was operated to vacuum up the inside of the furnace to reduce the pressure to −100 kPa, and then heating in the furnace was started at a temperature rising rate of 10° C./min. The inside of the furnace was heated to 600° C. over 1 hour, and after 10 minutes from the start of heating, a nitrogen gas was introduced into the inside of the furnace at a flow rate of 1 L/min. Reaction of the raw materials (starting materials) was continued by heating controlled at 600° C. for 3 hours in a nitrogen gas atmosphere to obtain a black sulfur-containing carbonitride.

Next, the heating of the furnace was stopped, and the on-off valve provided in the electric furnace was opened for about 20 minutes, so as to introduce an inert gas (atmosphere) containing an oxygen gas at normal temperature and pressure into the furnace. After the introduction of the inert gas, the temperature of the furnace was controlled so as to drop to 500° C. in 1 hour, and the on-off valve was opened again for about 20 minutes, so as to introduce an inert gas (atmosphere) containing an oxygen gas at normal temperature and pressure into the furnace. After the introduction of the inert gas, the temperature of the furnace was controlled so as to drop to 400° C. in 1 hour, and the on-off valve provided in the electric furnace was opened again for about 20 minutes, so as to introduce an inert gas (atmosphere) containing an oxygen gas at normal temperature and pressure into the furnace. After the introduction of the inert gas, the temperature of the furnace was controlled to drop to 300° C. in 1 hour. As described above, an inert gas (atmosphere) containing an oxygen gas was introduced into the furnace several times, and while the temperature was gradually lowered at a predetermined gradient, the inside of the furnace was cooled to normal temperature to obtain the sulfur-containing oxycarbonitride of the present invention. Finally, this product was crushed by a ball mill for about 1 hour.

Figure 2:
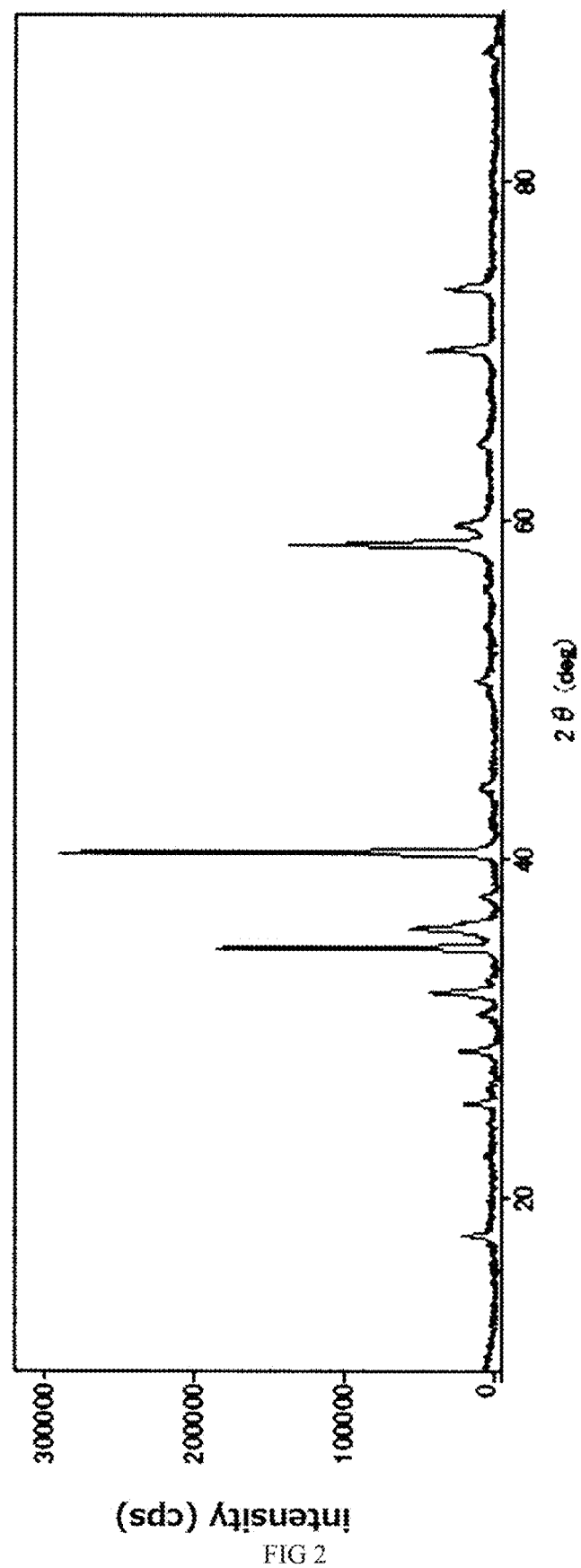
FIG. 2 is a powder X-ray diffraction spectrum of the catalyst (1) of Example 1.
Figure 3:
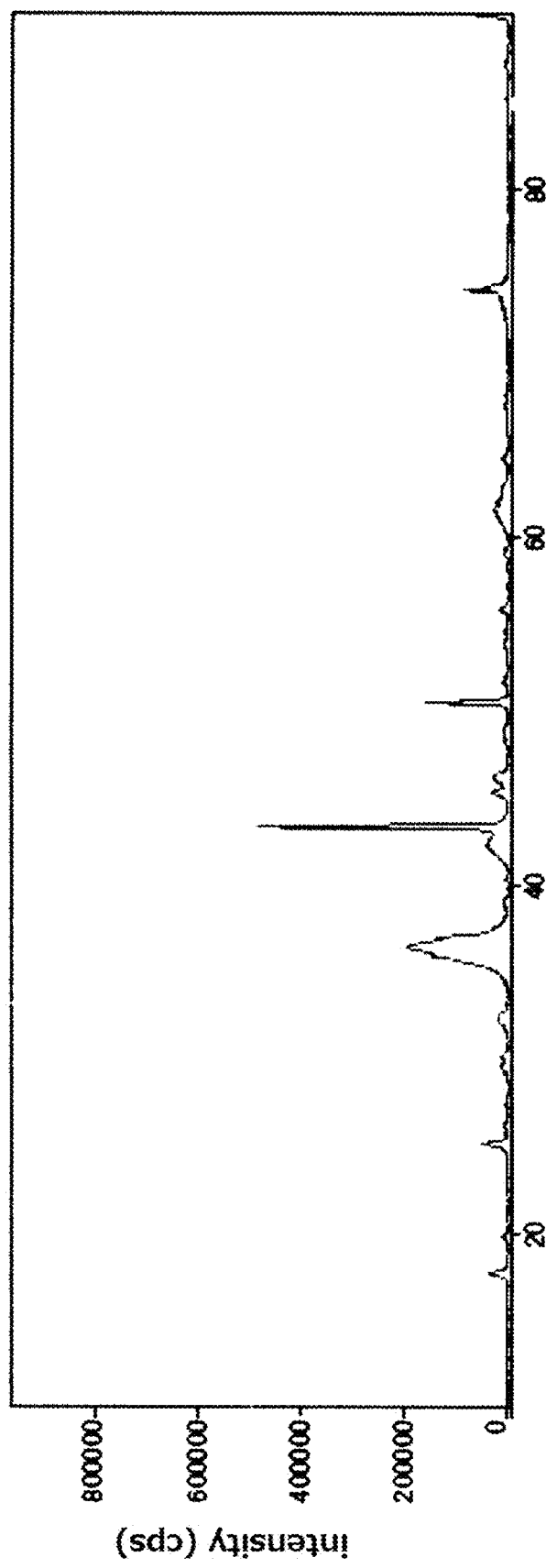
FIG. 3 is a powder X-ray diffraction spectrum of the catalyst (2) of Example 2.
Figure 4:
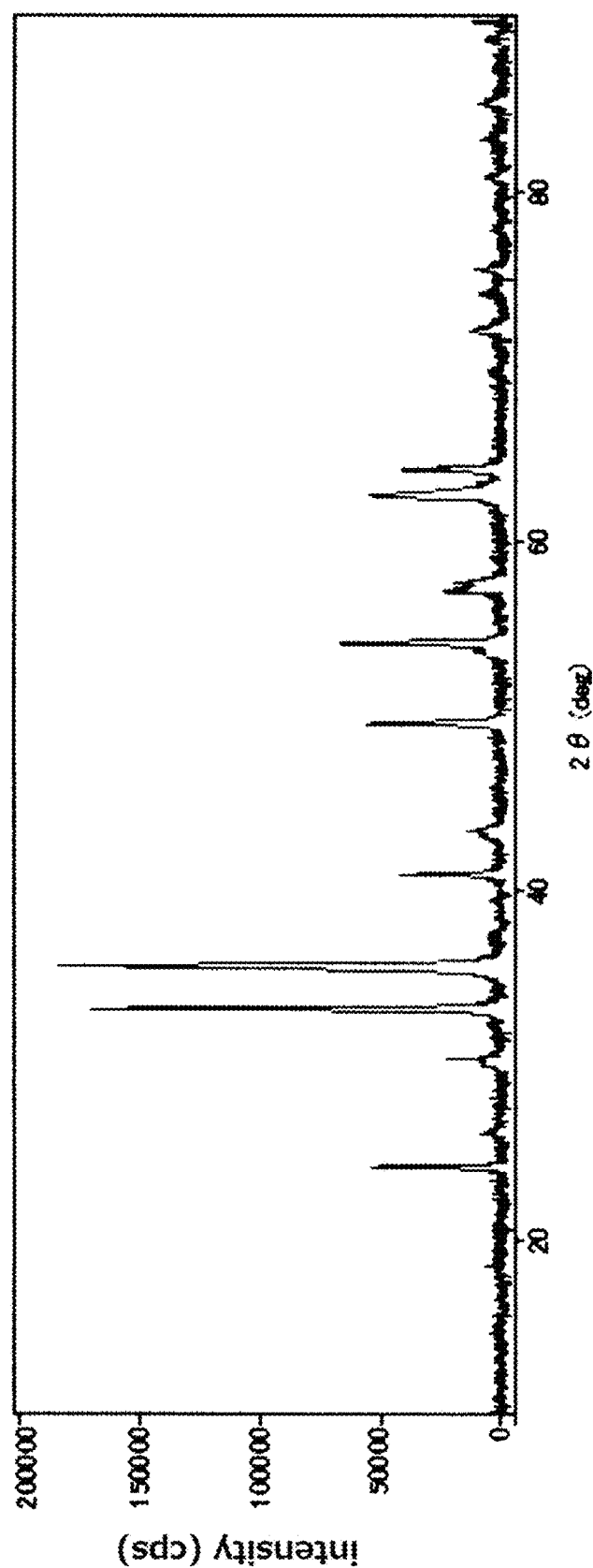
FIG. 4 is a powder X-ray diffraction spectrum of the catalyst (3) of Example 3.
Figure 6:
FIG. 6 is a SEM image (magnification ×2000) of Example 1.
Figure 7:
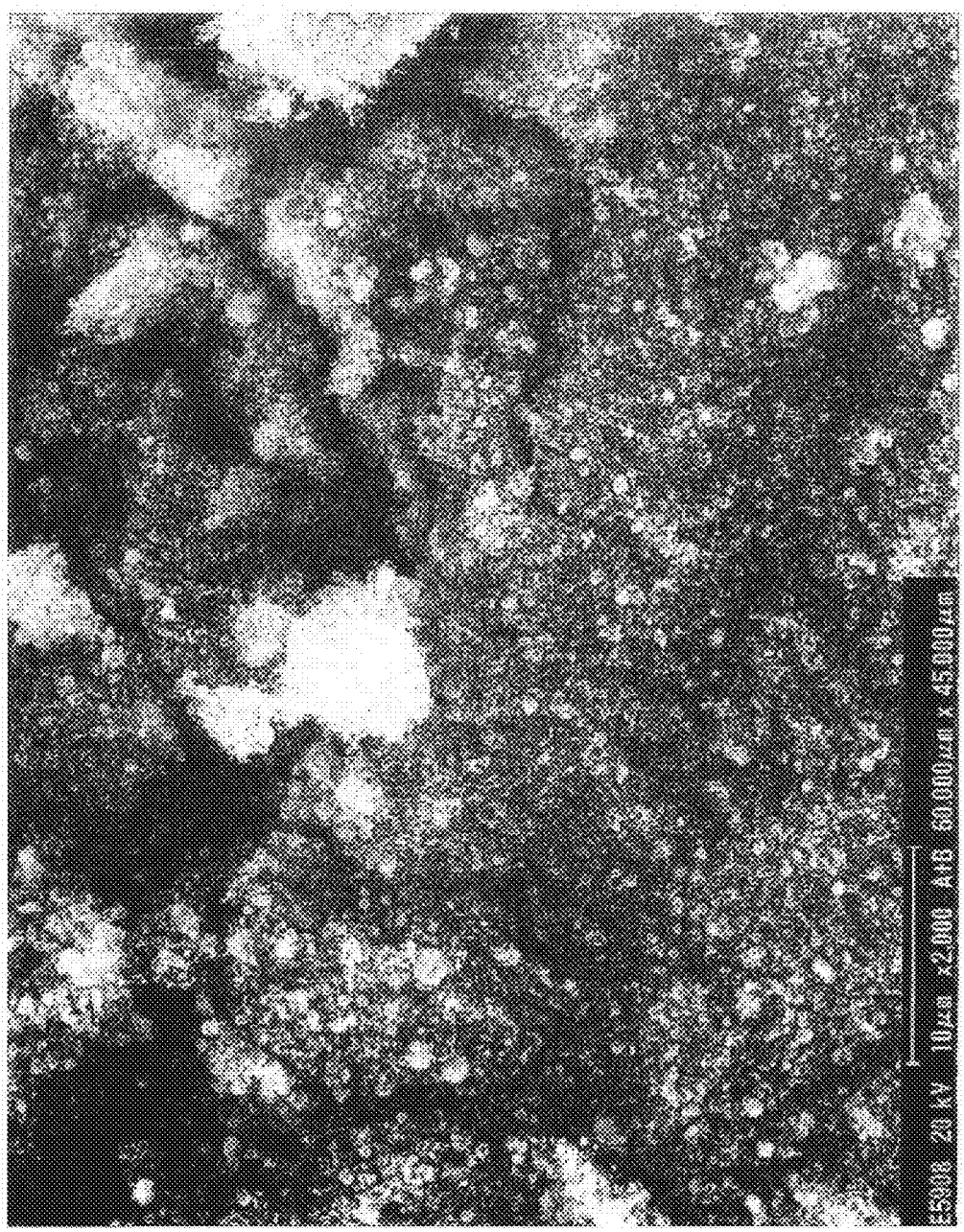
FIG. 7 is a SEM image (magnification ×2000) of Example 2.
Figure 8:
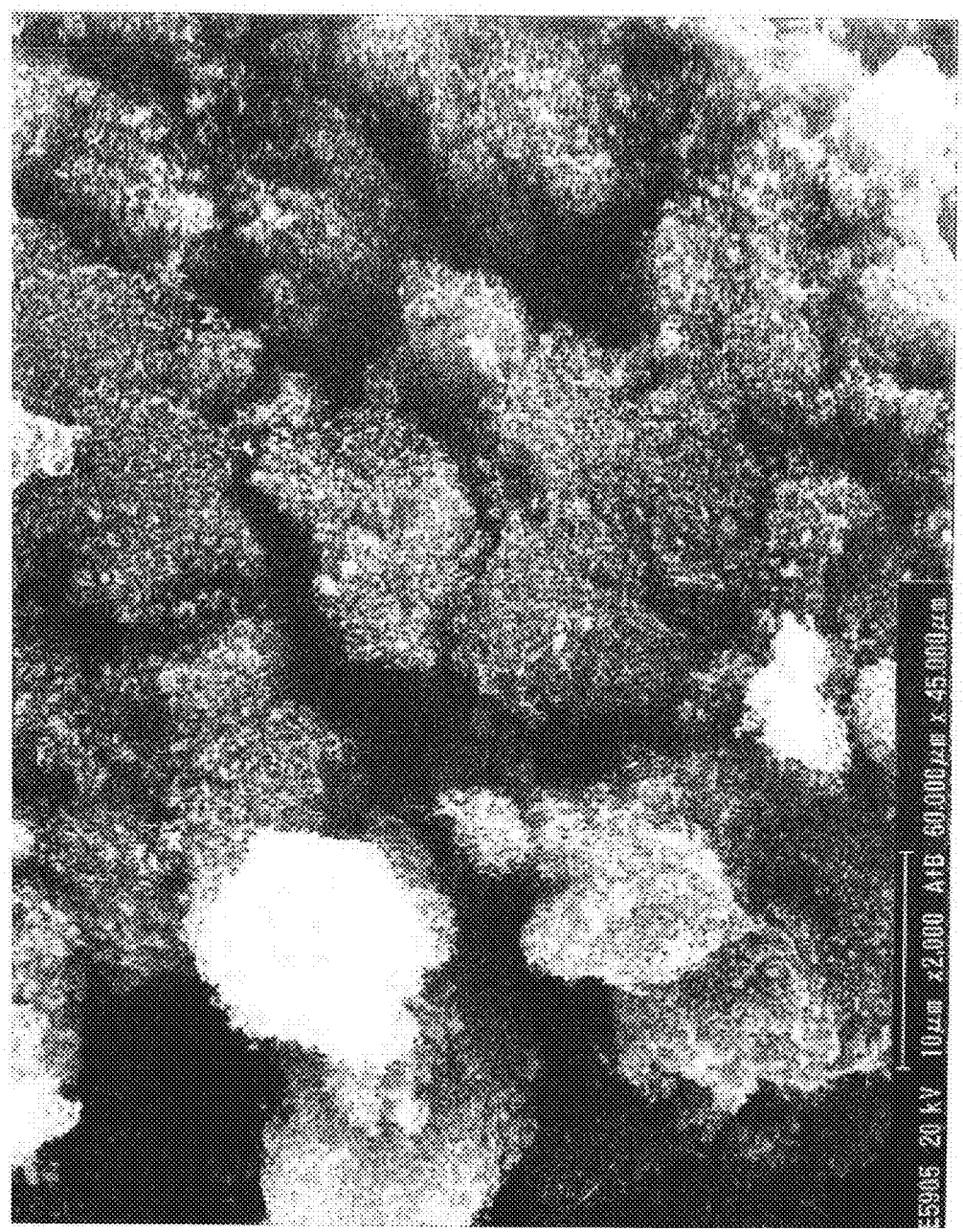
FIG. 8 is a SEM image (magnification ×2000) of Example 3.
Figure 9:
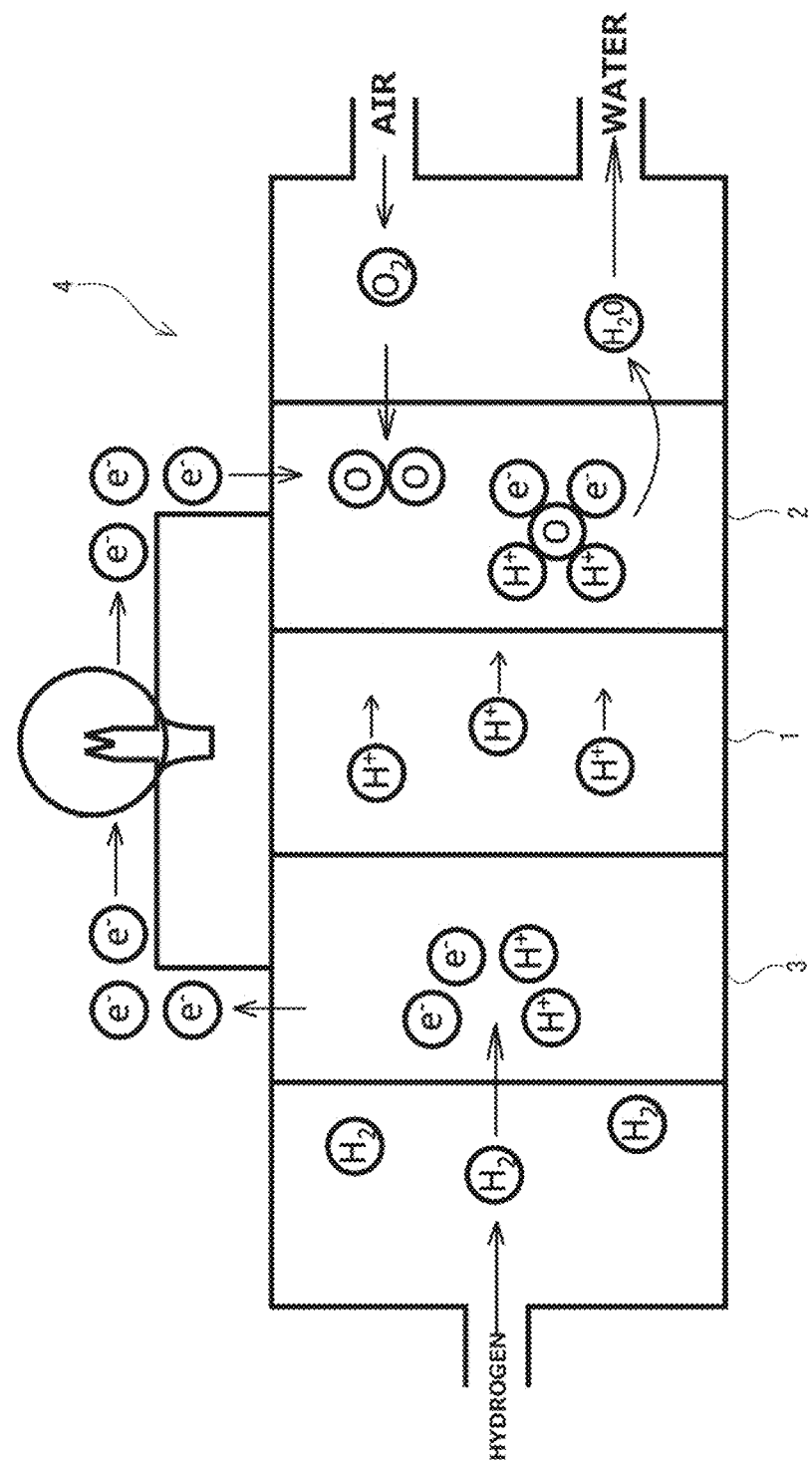
FIG. 9 is an exploded cross-sectional view describing the basic structure of a conventional solid polymer fuel cell.

The powder X-ray diffraction spectra for Examples 1 to 3 of the above examples are shown in FIGS. 2 to 4 (FIG. 2: Example 1, FIG. 3: Example 2, FIG. 4: Example 3). FIGS. 6 to 8 show SEM images taken by a scanning electron microscope for Examples 1 to 3 (FIG. 6: Example 1, FIG. 7: Example 2, and FIG. 8: Example 3).

The other physical properties for Examples 1 to 3 were as follows:
BET specific surface area of Example 1: 59.32 m$^2$/g
Particle diameter of Example 1: 10.28 μm
Porosity of Example 1: 87%
BET specific surface area of Example 2: 57.01 m$^2$/g
Particle diameter of Example 2: 7.29 μm
Porosity of Example 2: 84%
BET specific surface area of Example 3: 66.41 m$^2$/g
Particle diameter of Example 3: 9.15 μm
Porosity of Example 3: 89%

Next, electrodes for a fuel cell were produced using the catalysts of Examples 1 to 10 (sulfur-containing oxycarbonitride). The production of the electrode for a fuel cell was performed as follows.

0.06 g of the catalyst obtained above and 0.01 g of carbon (carbon black manufactured by Mitsubishi Chemical Corporation) were added in a mixed solution of ethylene glycol dimethyl ether and pure water in a mass ratio of 2:1, and mixed. This mixture was applied to a carbon sheet electrode (manufactured by Chemix Co., Ltd., length and width: 2 cm×2 cm) and press-dried at 60° C. for 7 minutes. Further, NAFION (registered trademark) (5% NAFION (registered trademark) solution (DE521) available from DuPont) diluted 10 times with ethylene glycol dimethyl ether was applied and dried at 120° C. for 1 hour to obtain an electrode for a fuel cell.

Next, the catalytic ability (oxygen reduction ability) of the produced electrode for a fuel cell was evaluated by the following method.

An electrode for a fuel cell produced in the above-described method was used as an electrode on the side of a positive electrode, and a platinum catalyst was used as an electrode on the side of a negative electrode with the NAFION membrane interposed therebetween. A fuel cell kit using hydrogen fuel (fuel cell assembly kit Pem Master (registered trademark) PEM-004 manufactured by Chemix Corporation) was used, and the carbon sheet electrode after application of the platinum catalyst was used as the negative electrode, and the carbon sheet electrode after application of the catalyst was used as the positive electrode. On the other hand, the oxygen reduction starting potential of the produced fuel cell was measured using a charging/discharging device (HJR-110mSM6 manufactured by Hokuto Denko Corp.). During measurement, the flow rate of hydrogen was 0.2 to 0.4 l/MIN.

The discharge characteristics measured by this charging/discharging device were evaluated as the catalytic ability (oxygen reduction ability) of the electrode (1) for a fuel cell. That is, the higher the oxygen reduction starting potential and the larger the oxygen reduction current are, the higher the catalytic ability (oxygen reduction ability) of the electrode (1) for a fuel cell is. The values of the oxygen reduction starting potentials measured for Examples 1 to 10 are shown in Table 2 below.

TABLE 2

| | Oxygen reduction starting potential (V) |
|---|---|
| Example 1 | 0.997 |
| Example 2 | 0.981 |
| Example 3 | 0.668 |
| Example 4 | 0.579 |
| Example 5 | 0.610 |
| Example 6 | 0.709 |
| Example 7 | 0.613 |
| Example 8 | 0.781 |
| Example 9 | 0.695 |
| Example 10 | 0.614 |

As shown in Table 2, the oxygen reduction starting potential of the fuel cells (Examples 1 and 2) using the catalyst containing, in particular, manganese and copper among the metals K exhibited a higher value than that of the fuel cells (Examples 3 to 10) using other catalysts. The results indicated that the catalysts containing manganese or copper (Examples 1 and 2) have a high catalytic ability (oxygen reduction ability) among them.

In particular, since the oxygen reduction starting potential according to Example 1 and Example 2 have high values in the vicinity of 1 V, the catalysts of Example 1 and Example 2 have a high catalytic ability comparable to the platinum catalysts generally used in the past.

Figure 5:
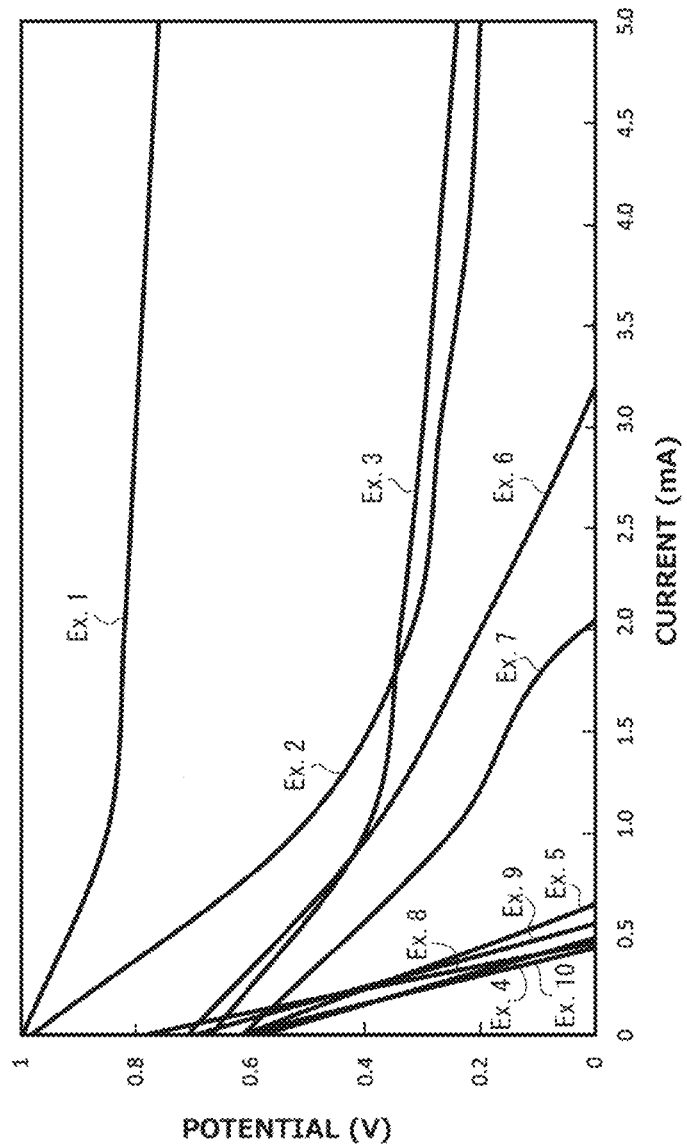
FIG. 5 is a graph showing current-voltage characteristics of fuel cells according to Examples 1 to 10.

Next, the current-voltage characteristics of the fuel cells of Examples 1 to 10 are shown in FIG. 5. The horizontal axis in FIG. 5 represents the current value (mA) output from the fuel cell, and the vertical axis in FIG. 5 corresponds to the output potential (V) at each current value. The potential when the current value is 0 mA corresponds to the above-mentioned oxygen reduction starting potential.

As shown in FIG. 5, the potentials of Examples 1 to 3 all decreased with an increase in current. However, even if the current was increased up to 5.0 mA, the positive potential was maintained in each case. In contrast, the potentials of Example 4, Example 5, Example 8, Example 9, and Example 10 all decreased rapidly compared to Example 1 to Example 3. Eventually, the potential in each case became 0 V at the time point of 1.0 mA. Similarly, the potentials of Examples 6 and 7 decreased more rapidly than those of Examples 1 to 3. Eventually, the potential was 0 V at 2.0 mA (Example 7) or 3.5 mA (Example 6).

From these results, it was suggested that the resistance component inside the device, which increases with the increase in current, was significantly suppressed in the fuel cells of Examples 1 to 3 as compared with Examples 4 to 10. From this fact, it was found that Examples 1 to 3 (manganese, copper, and iron were used as the metal K) were superior to the other examples in terms of output characteristics of the fuel cell.

Next, experimental results (oxygen reduction starting potential) of samples (Examples 11 to 22) using a sulfur compound without using sulfur as a starting material will be described. In Examples 11 to 22, the list of the starting materials and the added amounts thereof are as shown in Table 3 below.

As molybdenum sulfide, molybdenum oxide, molybdenum, manganese sulfide, manganese oxide, manganese, copper sulfide, copper oxide, copper, iron oxide, and iron shown in Table 3, those manufactured by Wako Pure Chemical Industries, Ltd. were used. As boron shown in Table 3, a reagent grade boron was used. Further, as the carbon shown in Table 3, carbon black (particle diameter: 26 nm to 30 nm) manufactured by Mitsubishi Chemical Corporation was used.

TABLE 3

Unit: g

| | Molybdenum sulfide | Molybdenum oxide | Molybdenum | Metal K or its compound | Boron | Carbon |
|---|---|---|---|---|---|---|
| Example 11 | 1.00 | | | 1.60 Manganese sulfide | 0.07 | 1.10 |
| Example 12 | 1.00 | | | 4.27 Manganese oxide | 0.15 | 2.20 |
| Example 13 | 1.00 | | | 1.02 Manganese | 0.06 | 0.09 |
| Example 14 | | 1.00 | | 1.80 Manganese sulfide | 0.08 | 1.20 |
| Example 15 | | | 1.00 | 2.70 Manganese sulfide | 0.08 | 1.62 |
| Example 16 | 1.00 | | | 1.79 Cupper sulfide | 0.08 | 1.23 |
| Example 17 | 1.00 | | | 2.68 Copper oxide | 0.08 | 1.61 |
| Example 18 | 1.00 | | | 1.19 Copper | 0.06 | 0.96 |
| Example 19 | | 1.00 | | 1.99 Cupper sulfide | 0.08 | 1.31 |
| Example 20 | | | 1.00 | 2.98 Cupper sulfide | 0.08 | 1.74 |
| Example 21 | 1.00 | | | 2.98 Iron oxide | 0.11 | 1.75 |
| Example 22 | 1.00 | | | 1.04 Iron | 0.06 | 0.90 |

On the basis of the starting materials shown in Table 3, catalysts (sulfur-containing oxycarbonitrides) were produced in the same manner as in Examples 1 to 10 above. Fuel cells containing these catalysts were produced in the same manner as in Examples 1 to 10. Further, the oxygen reduction starting potentials of the produced fuel cells were measured in the same manner as in Examples 1 to 10. The values of the measured oxygen reduction starting potentials for Examples 11 to 22 are shown in Table 4.

TABLE 4

| | Oxygen reduction starting potential (V) |
|---|---|
| Example 11 | 0.861 |
| Example 12 | 0.869 |
| Example 13 | 0.684 |
| Example 14 | 0.721 |
| Example 15 | 0.706 |
| Example 16 | 0.543 |
| Example 17 | 0.331 |
| Example 18 | 0.352 |
| Example 19 | 0.570 |
| Example 20 | 0.496 |
| Example 21 | 0.443 |
| Example 22 | 0.649 |

As shown in Table 4, the oxygen reduction starting potentials of all the Examples 11 to 22 were below those of the above-described Examples 1 and 2 containing sulfur as the starting material. From these results, it was suggested that the redox ability of the catalyst containing sulfur as the starting material as in Example 1 and Example 2 was likely to be higher than that of the catalyst containing no sulfur as the starting material.

INDUSTRIAL APPLICABILITY

The catalyst of the present invention does not corrode in an acidic electrolyte, is excellent in durability and is inexpensive because it utilizes a general-purpose metal. The catalyst can be used as an electrode serving as a positive electrode catalyst layer for a fuel cell and as a positive electrode catalyst for an air cell.

The invention claimed is:

1. A porous catalyst comprising a sulfur-containing oxycarbonitride containing molybdenum, boron, and the following metal K, where the metal K is at least one metal selected from the group consisting of tantalum, zirconium, copper, iron, tungsten, titanium, vanadium, cobalt, manganese, aluminum, and nickel.

2. The porous catalyst of claim 1, wherein the metal K is at least one metal selected from the group consisting of copper, iron, and manganese.

3. The porous catalyst of claim 1, further comprising a proton conductive site.

4. The porous catalyst of claim 1, wherein the porous catalyst is pulverized to form fine particles.

5. The porous catalyst of claim 1, having a BET specific surface area of 50 m$^2$/g to 80 m$^2$/g.

6. The porous catalyst of claim 1, wherein the porous catalyst is formed in a particle shape, and a particle diameter of the particles is 0.1 μm to 25 μm.

7. A method for producing the porous catalyst according to claim 1, comprising the following steps (A) and (B):
   (A) heating a starting material selected from at least one of a group consisting of:
   (1) sulfur and a sulfur compound, the sulfur compound selected from at least one of the group consisting of an oxide, carbide and nitride thereof;
   (2) boron and a boron compound, the boron compound selected from at least one of the group consisting of an oxide, carbide and nitride thereof;
   (3) molybdenum and a molybdenum compound, the molybdenum compound selected from at least one of the group consisting of an oxide, carbide, and nitride thereof;

(4) carbon; and (5) a metal K described below and a metal K compound, the metal K compound selected from at least one of a group consisting of an oxide, carbide, and nitride thereof, in a nitrogen gas or an inert gas containing a nitrogen gas to produce a sulfur-containing carbonitride; and (B) heating the sulfur-containing carbonitride obtained in the step (A) in an inert gas containing an oxygen gas to produce a sulfur-containing oxycarbonitride, where the metal K is at least one metal selected from the group consisting of tantalum, zirconium, copper, iron, tungsten, titanium, vanadium, cobalt, manganese, aluminum, and nickel.

8. The method for producing the porous catalyst of claim 7, wherein sulfur is used in the starting material (1) of the step (A).

9. The method for producing the porous catalyst of claim 7, further comprising a step of pulverizing the sulfur-containing oxycarbonitride.

10. The method for producing the porous catalyst of claim 7, wherein a heating temperature is selected from at least one of a group consisting of the step (A) and the step (B) is 200° C. to 800° C.

11. The method for producing the porous catalyst of claim 7, wherein the heating step is selected from at least one of a group consisting of the step (A) and the step (B) is performed for 5 hours to 10 hours.

12. A catalyst layer for a fuel cell comprising the porous catalyst of claim 1.

13. The catalyst layer for a fuel cell of claim 12, further comprising electron conductive particles having a particle diameter of 3 nm to 500 nm.

14. An electrode comprising the catalyst layer for a fuel cell of claim 12, and a gas diffusion layer.

15. A membrane electrode assembly comprising:

an anode;

a cathode; and an electrolyte membrane disposed therebetween, where the cathode is the electrode of claim 14.

16. A fuel cell comprising the membrane electrode assembly of claim 15.

17. A solid polymer fuel cell comprising the membrane electrode assembly of claim 15.

* * * * *